United States Patent [19]

O'Day et al.

[11] 3,814,863

[45] June 4, 1974

[54] INTERNALLY BIASED MAGNETORESISTIVE MAGNETIC TRANSDUCER

[75] Inventors: Richard L. O'Day, Boulder; Frank B. Shelledy, Longmont, both of Colo.

[73] Assignee: International Business Machines Corporation, Armonk, N.Y.

[22] Filed: Oct. 11, 1972

[21] Appl. No.: 296,743

[52] U.S. Cl. .......................... 360/113, 338/324

[51] Int. Cl. .......................... G11b 5/30, H01c 7/16

[58] Field of Search ..... 179/100.2 CH; 340/174 EB; 338/32 R

[56] References Cited

UNITED STATES PATENTS 3,731,007 5/1973 Masuda et al. ............ 179/100.2 CH

*Primary Examiner*—S. W. Moffitt
*Assistant Examiner*—Alfred H. Eddleman
*Attorney, Agent, or Firm*—Gunter A. Hauptman

[57] ABSTRACT

A magnetic transducer exhibiting the magnetoresistive (MR) effect includes at least two thin film layers. A three-legged MR film in electrical contact with a higher resistivity layer is magnetically biased by a portion of the MR sense current shunted through the nonmagnetic layer. The need for an accurate and stable bias to reduce distortion is eliminated by subjecting similar adjacent MR elements to opposite currents. Each element is then symmetrically and oppositely biased so that a differential resistance sensing circuit provides an output signal relatively immune to distortion.

19 Claims, 5 Drawing Figures

INTERNALLY BIASED MAGNETORESISTIVE MAGNETIC TRANSDUCER

FIELD OF THE INVENTION

The invention relates to magnetoresistive transducers and more particularly to magnetic biasing of thin film magnetic read heads including magnetoresistive material.

CROSS-REFERENCES TO RELATED APPLICATION

Ser. No. 296,742, "Internally Biased Magnetoresistive Magnetic Transducer," by G. W. Brock and F. B. Shelledy, filed Oct. 11, 1972, and commonly assigned.

DETAILED DESCRIPTION

A magnetoresistive (MR) element exhibits a change in resistance as a function of the magnetic flux $\Phi$ to which it is exposed. This characteristic should be compared to more conventional devices which sense the rate of change of magnetic flux $d\Phi/dt$ and, therefore, supply signals dependent upon the rate of change and not the number of flux lines. Thus, for example, the output from a conventional head for reading information from a magnetic medium is a function of the medium's velocity (which determines the rate of change of the magnetic flux sensed by the head) and is operable over only a relatively narrow range of medium speeds. On the other hand, an MR element will give a constant output over an extremely wide range of medium speeds because its operation is independent of the rate of the magnetic flux changes. The MR effect should also be distinguished from the Hall effect where a magnetic field causes a potential to appear across a material as a function of the field's flux density B. Hall devices, like MR devices, do not require motion relative to the magnetic field; however, Hall and MR devices are otherwise quite different in the materials used, noise generated, usable frequency ranges, ease of fabrication, etc. As discussed in Green U.S. Pat. No. 3,379,895, issued April 23, 1968, the MR and Hall effects are antithetic.

The change in resistance $\Delta R$ of an MR device is an essentially nonlinear function of the strength of the field H to which the device is exposed. For most applications, for example magnetic read heads, it is desirable to center operation in the most linear region. This has usually been accomplished by supplying a fixed bias field generated by either an electromagnet as in U.S. Pat. No. 1,596,558, granted Aug. 17, 1926, to B. N. Sokoloff, or the permanent magnet of U.S. Pat. No. 2,500,953, granted Mar. 21, 1950, to M. L. Lisman. In order to reduce the structural size of MR devices, thin film technology has made it possible to bias an MR element, deposited as a film on a substrate, with a current applied to another thin film. For example, Grant et al U.S. Pat. No. 3,016,507, issued Jan. 9, 1962, shows a thin film deposited MR device and bias conductor separated by an insulator. The function of the conductor is eliminated in U.S. Pat. No. 3,366,939, granted Jan. 30, 1968, to de Chanteloup, where electric control current through a thin film MR element generates a field causing a change in the film's resistance which is then sensed by a separate signal processing circuit. Copeland U.S. Pat. No. 3,678,478, issued July 18, 1972, achieves partial self-biasing of separated single wall domain layers.

None of the foregoing art is directed toward eliminating the separate bias and sensing circuits required for a thin film MR element read head. The above-cited de Chanteloup patent merges separate bias and sense current in a control device, eliminating a separate bias source but not suggesting any other uses. The Copeland patent does not address MR technology and suggests that an external magnetic field is still required. It has been suggested in the prior art that MR elements, usually formed of a single layer of one material, be made in a number of layers of different materials. U.S. Pat. No. 2,984,825, granted May 16, 1961, to Fuller et al, suggests layers of magnetic material separated by insulators and connected in parallel to a single current source. Hardening materials such as copper, aluminum, etc., are deposited on an otherwise conventionally used MR element in Broadbent U.S. Pat. No. 3,256,483, issued June 14, 1966. Collins et al U.S. Pat. No. 3,592,708, issued July 13, 1971, and U..S Pat. No. 3,617,975, issued Nov. 2, 1971, to Wieder, shorten magnetic shunt paths or short-circuit Hall fields believed to adversely effect MR device sensitivity. Ferrite layers for magnetic field concentration in a conventionally biased MR head are suggested in Hunt U.S. Pat. No. 3,493,694, granted Feb. 3, 1970. An article by Ahn and Hendel in the IBM TECHNICAL DISCLOSURE BULLETIN, Nov., 1971, page 1850, suggests providing a bias field for bubble domain devices by depositing a magnetically biased Permalloy layer on the magnetic substrate to reduce the external bias field by at least 25 percent.

In the referenced Brock et al application, it is disclosed that conventional bias source may be completely eliminated and the performance and reliability of MR elements simultaneously improved by mating an MR layer and a shunt bias layer without intervening insulation. This permits the design of unusually simple and practical magnetic media read heads and sensing circuits usable over a wide range of medium velocities. The shunt layer: (1) eliminates a separate bias path by generating the bias field directly from a portion of the sensing current applied to the device, (2) increases MR reliability by providing a shunt current path around defects in the MR layer, (3) simplifies manufacture by eliminating hard-to-deposit thin insulating films which often break down during use, and (4) reduces costs by eliminating one conductor and two contacts, and a separate external bias circuit.

In the cross-referenced application, a thin film of material exhibiting the MR effect and a thin shunt bias film of a relatively higher resistivity material are intimately mated and suitably supported in magnetic fields representing information stored on media. Changes in resistance resulting from changes in the field are detected by monitoring current through the combination. Inasmuch as the changes in MR layer resistance are a nonlinear function of the magnetic field applied to the MR layer, the resulting distortion will depend on the operating point determined by the field from the bias film. Applicants have found that a two-layer, three-legged "E" connected to a bridge circuit markedly decreases MR sensitivity to stray fields, thermal noise and distortion. Two similar MR layers are subject to opposite and symmetric bias fields from oppositely circulating currents in the bias film. The MR layers supply oppositely distorted signals which are combined to attenuate the distortion. A sensing current supplied to the bridge circuit (in the manner of Oberg U.S. Pat. No. 3,382,448, issued May 7, 1968; L. A. Russell's IBM TECHNICAL DISCLOSURE BULLETIN article, Nov., 1960, page 53; Reinwald U.S. Pat. No. 2,712,601, issued July 5, 1955; and de Koster U.S. Pat. No. RE26,610, issued June 24, 1969), provides a differential output relatively immune to distortion. The Rettinger U.S. Pat. No. 2,647,167, issued July 28, 1953, suggests a circuit for sensing the output of a device of this type.

The foregoing and other objects, features, and advantages of the invention will be apparent from the following more particular description of preferred embodiments of the invention, as illustrated in the accompanying drawings.

IN THE DRAWINGS

Figure 1:
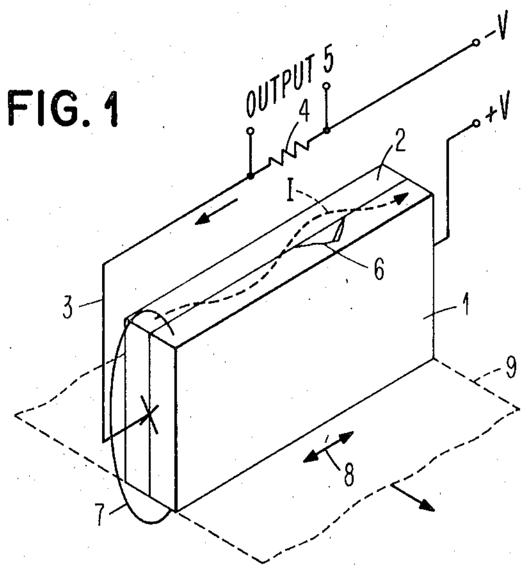
FIG. 1 is a line drawing of a two-film device illustrating the invention.

Referring to FIG. 1, there is shown a magnetoresistive (MR) film intimately electrically in contact with an underlying layer 2. A substrate may provide physical support to either, or both, layers. For example, the device may be used as a transducer for sensing magnetic flux from information stored on an illustrative magnetic medium 9 such as a magnetic tape, disc, drum, etc. Magnetization patterns on the medium will intercept the MR film and effect its resistance as a function of information manifested by the patterns. An electric current is supplied via a wire 3 from a voltage source V. The current enters the layers 1 and 2 in such a way as to flow through both layers. An entrance at the interface between the two layers is shown for purposes of illustration only inasmuch as the current may first enter either the layer 1 or the layer 2. The current flowing in the wire 3 is determined by the voltage and the combined resistance of the wire 3, the layers 1 and 2, and a resistor 4 in accordance with Ohm's law. Therefore, there will appear, at an output 5, a voltage inversely proportional to the combined resistance of the two films 1 and 2. The current flowing through the film 1 and 2 is split between the two layers in proportion to their resistivity; the portion through the layer 2 creating a magnetic field 7 which intercepts the magnetoresistive (MR) film 1. In this manner, the MR film 1 is provided with a bias fixed by the amount of current flowing through the layer 2. While the current portion in the MR film also causes a magnetic field 7, which intercepts the layer 2, this field is not believed to be utilized in the invention.

Frequently, in the manufacture of devices including very thin films, defects occur in one or more films. In FIG. 1, a hole 6 is assumed to have occurred during the deposition of the film 1 on the film 2. It will be understood that many different types of defects may occur during manufacture or subsequent to manufacture during the use of the device. For example, cracks frequently occur in one or the other of the layers. Such defects present a barrier to the flow of current and thus effect the operation of the circuit in which the device is used inasmuch as the MR layer resistance will not bear the desired relationship to the magnetic field to which the device is exposed. The current I is shown as flowing into layer 2 to pass around the defect. In the absence of the layer 2, the defect would present a significant barrier to the current I through the flim 1. However, due to the presence of the layer 2, the current is able to shunt around the defect and thus flow unimpeded through the combined layers 1 and 2.

The choice of materials for the films 1 and 2 in FIG. 1 is a significant consideration. The magnetoresistive film 1 may be constructed of any materials currently used for such purposes or exhibiting a magnetoresistive effect. For example, it is believed that nickel-iron (NiFe) is a practical choice for the film 1 because it has a low $H_C$, high permeability and, of course, sensitive magnetoresistive characteristics. Among the many materials meeting this requirement are nickel-iron (Permalloy), nickel, etc. The thickness of the film 2 must be chosen to avoid very thin films (which are hard to deposit and do not provide homogeneous electrical resistance) and very thick films (which are unsuitable for receiving a magnetoresistive deposition because they are too rough). Thus, if a very thin magnetoresistive film 1 on the order of 300 angstroms is used, a relatively thicker shunt bias film on the order of 1,350 angstroms would be preferable and would appear to make processing easiest. The resistances of the shunt film 2 and the MR film 1 must permit sufficient current through the film 2 to provide magnetic bias for the film 1. This occurs for a variety of current proportions, for example when the resistances are approximately equal and about 50 percent of the source current is shunted through layer 2. While it has been found that a 50 percent division of current gives an operable output, other divisions are quite satisfactory. For example, tests have shown that a 60 or 40 percent current division is almost 96 percent as good as a 50 percent division.

The resistivity of the shunt material (for equal surface areas) should be about equal to that of the MR material of layer 1 in order to meet the thickness and current criteria previously discussed. Available materials, however, give shunt resistivities as high as three or four times the MR material resistivity. The resistivity of the shunt film 2 may be much higher if only stabilization, to minimize the effect of defects, is required, since the current will then be too small for effective biasing. Titanium (Ti) has a desirable resistivity of 75 micro-ohm centimeters compared to 20 micro-ohm centimeters for the nickel-iron MR layer 1. Gold (Au) (2.35 micro-ohm centimeters) and copper (Cu) (2.00 micro-ohm centimeters) are unsuitable. While tantalum (Ta) has not been tried, it is believed that it may have qualities similar to those of titanium and further has a resistivity very close to nickel-iron.

In addition to the above significant materials considerations, the shunt film 2 must be easily etched during manufacture without undercutting, and it must also adhere to any substrate provided. For example, rhodium (Rh) is not a suitable shunt film because it cannot be etched. The shunt film chosen should not be subject to electron migration effects and should not interact with the film 1 or with other films in which it is placed in contact. It has been found, that chromium (Cr) is not a suitable material if nickel-iron is used as the magnetoresistive layer 1 unless a separating layer is used between them. It being advantageous not to use a separating layer, it follows that chromium will not serve as an adequate shunt film.

Figure 2:
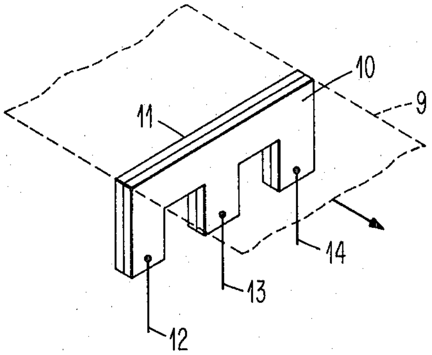
FIG. 2 is a drawing of a modified form of the FIG. 1 device incorporating the invention.

Referring now to FIG. 2, a modification of the device of FIG. 1, incorporating the invention hereof, will now be explained. The device comprises a magnetoresistive layer 10 and a shunt layer 11 in an E configuration permitting the attachment of wires 12, 13, 14. and 14. of the device as an E is not significant except insofar as it permits the attachment of a center tap 13 halfway between the connections 12 and 14. Any medium, for example a magnetic tape 9, is shown schematically in association with the device to indicate a source of magnetic flux. It will be understood that the device has many other uses and that the magnetic media may take many other forms such as drums or discs. The use and operation of this device will be explained subsequently with respect to FIGS. 4 and 5.

The detailed construction and a method for manufacturing the device of FIG. 2 will be explained with reference to FIG. 3. Magnetoresistive nickel-iron layer 10 and titanium layer 11 in FIG. 2 appear in FIG. 3 as films formed on $Al_2O_3$ layer 18 which in turn have been placed on ferrite pole piece 16. Copper connections 12, 13, and 14 are bonded to a copper pad 15 which is deposited on nickel-iron layer 10. Another $Al_2O_3$ film 19 is placed over the device and a second ferrite pole piece 17 completes the device, which is, in this case, a shielded magnetic head. The pole pieces 16 and 17 form a complete magnetic path through a conventional back gap, not shown. The $Al_2O_3$ layers 18 and 19 provide a wear resistant surface at the head surface and also magnetically separate the layers 10 and 11 from the ferrite pole pieces. It will be understood, that if wear resistance is not desired or is provided for by some other means, it is possible to provide a substitute for the $Al_2O_3$ layers. The ferrite blocks 16 and 17, in addition to providing a magnetic circuit, also divert unwanted magnetic fields away from the MR layer 10.

An illustrative method of making the head of FIG. 3 will now be given:

Step 1 A ferrite substrate is provided.

Step 2 $Al_2O_3$ is sputtered over the entire surface of the ferrite substrate to a depth of 25 microinches.

Step 3 Titanium (Ti) is deposited on the $Al_2O_3$ surface by vacuum deposition to a depth of 1,800 angstroms.

Step 4 Permalloy is deposited to a depth of 600 angstroms. The Permalloy is oriented with a 40 oersted field to give an easy axis as shown.

Step 5 The vacuum is broken and a shield is placed over the substrate to mask it during the next step.

Step 6 Copper is vacuum deposited over the nickel-iron surface, except in the throat area, to a depth of 20 microinches.

Step 7 A photoresist is applied to the metallized substrate to expose a read track pattern.

Step 8 The Permalloy and copper are etched with a ferric chloride etchant.

Step 9 The etched material is rinsed and dried.

Step 10 The titanium is etched with hydrofluoric acid and the photoresist is removed.

Step 11 $Al_2O_3$ is sputtered over the entire surface to a depth of 10 microinches to cover the legs so that the tracks can be wire bonded.

Step 12 The $Al_2O_3$ is etched away to exposure copper pads (15) using an appropriate etchant.

Step 13 Wire bonding is applied using standard techniques.

Step 14 A ferrite block is placed over the subassembly.

Figures 3, 4, 5:
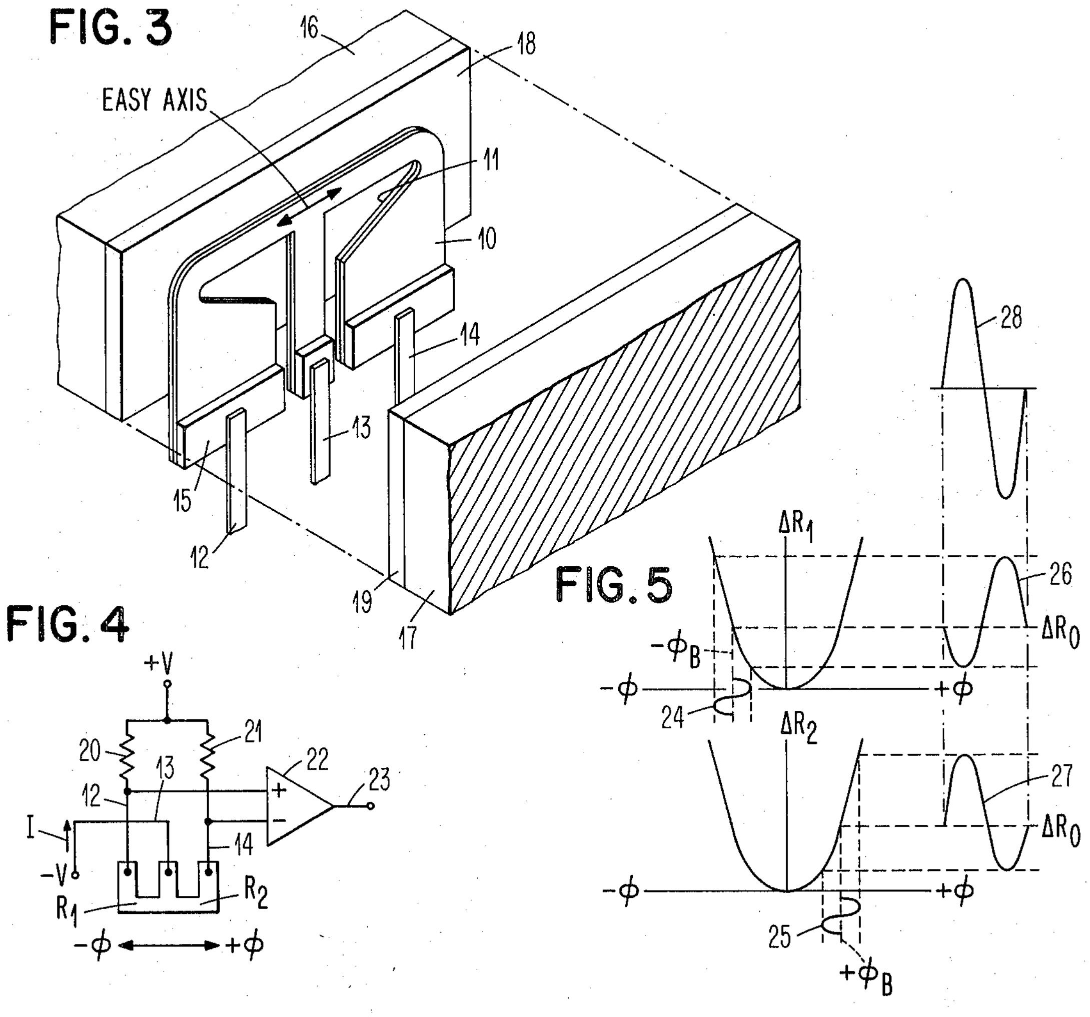
FIG. 3 is an exploded perspective view showing the details of construction of the device of FIG. 2.
FIG. 4 is a schematic drawing illustrating a circuit for sensing signals in the device of FIGS. 2 and 3.
FIG. 5 shows the operating curve of the FIG. 2 device.

Referring now to FIGS. 4 and 5, the circuit for utilizing the device of FIGS. 2 and 3, and its operation, will now be described. The transducers leads 12, 13, and 14 are connected into a four-arm bridge circuit comprising two sections of the transducer and additional balancing resistors 20 and 21. The value of these resistors is chosen to control the bias current flowing through the layers 10 and 11 of the transducer as well as balancing the bridge. A differential amplifier 22 and a source of voltage V are connected across the bridge circuit. The output of the differential amplifier 23 will accurately portray the resistance changes in the layers 10 and 11 and attenuate distortion due to nonlinearity of the curve of FIG. 5.

Typical response curves for the similar and symmetrically biased adjacent MR sections R1 and R2 of FIG. 4 are shown in FIG. 5. Each MR element or section R1 and R2 exhibits a small change in resistance $\Delta R1$ and $\Delta R2$ when properly excited by magnetic field flux $\Phi$. The change in resistance is single valued for bidirectional flux and nonlinear for unidirectional flux. Generally an operating point is selected by applying a bias field $\Phi B$ and allowing an information signal field 24 to cause variations about this operating point. The resistance changes 26 and 27 resulting from the information signals will not be a linear function of the information signal because the curve has no straight portions. Thus, severe amplitude distortion will result when the element is used as a quantitative sensor; for example, to sense data stored via a magnetic media. The amount of distortion can theoretically be reduced by biasing operation in a relatively linear region of the curve. This is not practical in commercial magnetic heads due to manufacturing and operating tolerances. About any given operating point ($\Phi$, $\Delta R$) the dynamic curve can be expressed as a power series. In this case, a Taylor series in terms of $\Delta R$:

$$\Delta R = a_0 + a_1\Phi + a_2\Phi^2 + a_3\Phi^3 + a_4\Phi^4 + \ldots$$

If only the first two terms on the right are used, the equation is a straight line and the response is linear. If the third term is added, it is a straight line plus a parabola. Thus, any curve can be approximated by the addition of the appropriate higher powers. Assume that about an operating point, the signal is in the form:

$$\Phi = \Phi m \mathrm{Cos}\omega t$$

then $$\Delta R = \Delta R_0 + a_1\Phi m\mathrm{Cos}\omega t + a_2\Phi m^2\mathrm{Cos}^2\omega t + a_3\Phi m^3\mathrm{Cos}^3\omega t + a_4\Phi m^4\mathrm{Cos}^4\omega t + \ldots$$

by trigonometric identities $$\Delta R = \Delta R_0 + A_0 + A_1\mathrm{Cos}\omega t + A_2\mathrm{Cos}2\omega t + A_3\mathrm{Cos}3\omega t + A_4\mathrm{Cos}4\omega t + \ldots$$

Thus, it is seen if the sensor is nonlinear, the amplitude distortion results from the generation of harmonics. In order to sense $\Delta R$ by conventional electrical means, a current must be applied to the element and voltage measured or vice versa. Assuming that a current I is applied to the element and the signal is sensed in the form of voltages, then:

$$I\Delta R = I\,[\Delta R_0 + A_0 + A_1\mathrm{Cos}\omega t + A_2\mathrm{Cos}2\omega t + A_3\mathrm{Cos}3\omega t + A_4\mathrm{Cos}4\omega t + \ldots]$$

let $$e_s = I\Delta R$$

$$e_s = e_0 + B_0 + B_1\mathrm{Cos}\omega t + B_2\mathrm{Cos}2\omega t + B_3\mathrm{Cos}3\omega t + B_4\mathrm{Cos}4\omega t + \ldots$$

In FIG. 5, when both elements are biased to symmetrical operating points, $-\Phi B$ and $\Phi B$, a single input information signal 24, say a positive increase in field, results in output signals from the element having a 180° phase difference.

Signal 26: $e_{s1} = E_s + a_{11}E_s\mathrm{Sin}\omega t + a_{12}E_s^2\mathrm{Sin}^2\omega t + a_{13}E_s^3\mathrm{Sin}^3\omega t + a_{14}E_s^4\mathrm{Sin}^4\omega t + \ldots$ Signal 27: $e_{s2} = E_s + a_{21}E_s\mathrm{Sin}(\omega t + \pi) + a_{21}E_s^2\mathrm{Sin}^2(\omega t + \pi) + a_{23}E_s^3\mathrm{Sin}^3(\omega t + \pi) + a_{24}E_s^4\mathrm{Sin}^4(\omega t + \pi) + \ldots$ $$e_{s1} + E_s + B_{10} + B_{11}\mathrm{Sin}\omega t - B_{12}\mathrm{Cos}2\omega t + B_{13}\mathrm{Sin}3\omega t - B_{14}\mathrm{Cos}4\omega t + \ldots$$

$$e_{s2} + E_s + B_{20} + B_{21}\mathrm{Sin}(\omega t + \pi) - B_{22}\mathrm{Cos}2(\omega t + \pi) + B_{23}\mathrm{Sin}3(\omega t + \pi) - B_{24}\mathrm{Cos}4(\omega t + \pi) + \ldots$$

but $$\mathrm{Sin}(\omega t + \pi) = -\mathrm{Sin}\omega t$$

$$\mathrm{Cos}2(\omega t + \pi) = \mathrm{Cos}2\omega t$$

and similarly for all even and odd harmonics $$e_{s2} = E_s + B_{20} - B_{21}\mathrm{Sin}\omega t - B_{22}\mathrm{Cos}2\omega t - B_{23}\mathrm{Sin}3\omega t - B_{24}\mathrm{Cos}4\omega t + \ldots$$

Differentially summing the two signals

Signal 28: $e_{s1} - e_{s2} = (B_{10} - B_{20}) + (B_{11} + B_{21})\,\mathrm{Sin}\omega t - (B_{12} - B_{22})\,\mathrm{Cos}2\omega t + (B_{13} + B_{23})\,\mathrm{Sin}3\omega t - (B_{14} - B_{24})\,\mathrm{Cos}4\omega t + \ldots$ Note that the DC components and the even harmonics coefficients subtract while the odd harmonics coefficients add.

If the two elements are similar, then the coefficients of each component will tend to be equal and:

$$e_{s1} - e_{s2} \rightarrow 2B_1\mathrm{Sin}\omega t + 2B_3\mathrm{Sin}3\omega t + \ldots$$

with the DC and even harmonic components approaching zero amplitude.

Further, it can be shown that the even harmonics will contribute either amplitude or time asymmetry to the waveform while the odd harmonics result in symmetrical distortion. It is the asymmetrical distortion that tends to obscure the data.

It will be understood that many modifications of the invention are possible. For example, it is possible to provide magnetoresistive material for each layer. In such a case, the effects and optimum performance previously described will not be achieved, but other advantages may make such a substitution desirable. It is also possible in using more than two layers of magnetoresistive or shunt material to achieve common mode rejection and additive effects. In the specification, the terms film, layer, film layer, and the like are interchangeably used to identify thin laminar materials. Inasmuch as the underlying layer, for example layer 2 in FIG. 1, serves several functions, it may be referred to as a stabilizing layer, shunt film, resistive layer, bias layer, etc.

While the invention has been particularly shown and described with reference to preferred embodiments thereof, it will be understood by those skilled in the art that various changes in form and details may be made therein without departing from the spirit and scope of the invention.

What is claimed is:

1. A method for attenuating distortion, in magnetic read heads utilizing films exhibiting the magnetoresistive effect, resulting from non-linearity in the resistance-magnetic field characteristic of the films, where the operating point about which resistance changes occur is determined by a magnetic field bias generated by a current through another film in the head, including the steps of:

supplying current through the magnetoresistive films and said other films as a function of the relative resistances of the films;

splitting the current through said other films into at least two current paths to generate a number of bias fields, for each current path, which subject the magnetoresistive films to at least two substantially equal and opposite fields; and sensing the resistance changes in the magnetoresistive films as a function of the fields which they intercept.

2. Apparatus for attenuating output signal distortion from a self-biased magnetic transducer utilizing the magnetoresistive effect to read magnetically recorded data, including:

a plurality of transducer elements, each exhibiting resistance changes as a nonlinear function of magnetic fields representing data, and each operable by a current to generate an additional bias magnetic field for setting a resistance value about which changes occur in response to data magnetic fields;

a current source for supplying electric current;

connecting means, completing an electric circuit between said current source and said transducer elements, for permitting the current source to supply to each element a sense current for aiding in the identification of element resistance and a bias current for generating the bias field, the bias current for a first number of the elements having a first magnitude and first direction and the bias current for a second number of the elements having the first magnitude and a second direction.

3. The apparatus of claim 2 wherein there are additionally provided detection means connected to the elements and the source operable to detect, via the sense current, the resistance changes in the elements and generate an output signal as a summation thereof.

4. The apparatus of claim 3 wherein each element includes at least two thin film layers, one exhibiting the resistance change and the other generating the bias field.

5. The apparatus of claim 4 wherein there are an even number of transducer elements.

6. The apparatus of claim 5 wherein all the transducer elements are formed of a single set of film layers.

7. In a system incorporating a transducer element subject to magnetic field input signals representing information on an associated medium, the transducer element exhibiting resistance changes as a nonlinear function of the input signals to which it is subjected, the transducer resistance being sensed as an output signal by applying a current through the transducer element, which current also serves to magnetically bias the transducer element at an operating point on a curve representing the nonlinear function, which nonlinearity is responsible for substantial distortion in the output signal relative to the input signal; a combination for producing an output signal with attenuated distortion, comprising:

a first transducer element exhibiting resistance changes as a predetermined nonlinear function of magnetic field input signal from an associated medium;

a second transducer element, in electrical contact with said first element and subject to the same magnetic field input signal, exhibiting resistance changes as a predetermined nonlinear function of the input signal, which function is substantially identical to the function of the first element;

a current source, for supplying an electric current;

conductors, connected to both the first and second elements and to the current source, for applying to each element a sense current portion from the current source useful for sensing the resistance of the element and a bias current portion from the current source for biasing the first element with a given magnetic field bias value and biasing the second element with an essentially equal and opposite value; and detection means, connected to the current source and elements, for sensing as output signals, the resistance of each element in accordance with the current portion through the element and combining the output signals to provide a single output signal with attenuated distortion traceable to the nonlinearity.

8. The combination recited in claim 7 wherein the detector further includes:

a pair of resistance devices, connected to the source and the transducer elements to form a resistance bridge exhibiting at an output a voltage change as a function of element resistance changes; and a differential summation device, connected to the bridge output for providing a single output signal.

9. The combination of claim 8 wherein the transducer elements each include a plurality of thin film layers, one layer receiving the sense current portion and another layer receiving the bias current portion.

10. The combination of claim 9 wherein the transducer elements are constructed from the same thin film layer sets.

11. The combination of claim 10 wherein the transducer is constructed in the shape of an "E".

12. In combination:

a medium for supplying magnetic fields representing information recorded thereon;

a multi-section multi-layered thin film element, in the vicinity of the medium, having a first layer exhibiting resistance changes as a function of magnetic field strength and a second layer for generating an additional magnetic field for biasing the first layer;

a plurality of resistors, one for each element section, connected to the element to form a resistance bridge having an input and an output;

a potential source, connected to the bridge input for circulating currents through the element sections in different directions; and a voltage detector connected to the bridge output for detecting as voltage changes resistance changes.

13. A multi-layer thin film magnetic transducer substantially immune from common mode noise and utilizing the magnetoresistive effect to indicate as voltage changes the strength of magnetic fields recorded on a medium, wherein transducer resistance changes are detected as voltage changes, and a magnetic bias field necessary to maintain a substantially linear relationship between changes in the field and resulting changes in the resistance is generated by the same electric current which detects resistance changes; comprising in combination:

a multi-layer planar element comprising a plurality of adjacent areas on a layer, exhibiting the magnetoresistive effect, at least two conductors capable of passing current through each area and a shunt layer associated with the magnetoresistive layers and conductors;

a magnetic media, associated with the element, for supplying magnetic fields encompassing portions of the element magnetoresistive areas;

resistive elements, each having an end connected to some, but not all, of the conductors;

a voltage source, connected to another end of said resistive elements and to a number of conductors not connected to resistive elements, for supplying a current to the element and providing a plurality of current paths through said element, at least one for each magnetoresistive area; and sensing means, connected to resistive elements and selected element conductors capable of sensing as voltage variations current changes in the current path through the element areas as a result of resistance variations caused by magnetic media changes.

14. A magnetic read head for exhibiting differing resistance values for differing magnetic field intensities resulting from magnetic media manifestations, over relatively linear and nonlinear ranges, comprising:

a first film of magnetically active and electrically conductive material, having a plurality of electrical access points defining a plurality of discrete areas, each area capable of exhibiting the relatively linear magnetoresistive effect in response to a range of magnetic field intensities centered about a bias intensity value;

a second film of electrically conductive material having at least one surface in intimate contact with a surface of the first film, capable of generating a magnetic field in response to an electric current sufficient to envelope a portion of the first film and supply said bias value; and a source of electric current associated with the first film electrical access points for passing a current through the first and second films whereby the current through the second layer provides a bias to the first film and voltage between pairs of access points indicates the resistance of the first film area defined by each pair over the relatively linear range centered about the bias.

15. The head of claim 14 wherein there is additionally provided measuring means connected to said electrical access points and source comprising a plurality of discrete film areas and each having a resistance value substantially equal to a resistance value of a film area.

16. A magnetically responsive element for exhibiting resistance changes as a function of the number of magnetic lines of flux cut by the element, including:

a source of magnetic lines of flux;

a plurality of adjacent layers of substantially conductive material in conductive contact, capable of being exposed to said magnetic source;

conductive means for passing a current through said layers in a plurality of paths;
a source of electric current, connected to said conductive means, for passing a current through the layers whereby:
the current through at least one of the layers provides a magnetic field encompassing a portion of at least one of the other layers, and the encompassed layer is thereby magnetically biased to exhibit a relatively linear range of resistance values in response to said magnetic source; and
the current through the encompassed layer being divided into a plurality of portions; and
means connected to said conductive means and said source for detecting the resistance of the encompassed layer as a function of the current portions.

17. A device for manifesting as different resistance values different magnetic field strength, comprising:
a number of juxtaposed layers of magnetoresistive material and relatively conductive shunt material forming an electric circuit exposable to a magnetic field;
a number of access means connected to said layers for passing a current through said circuit via more than two points;
means connected to said access means for supplying a current to said layers, the current being distributed through each layer inversely in proportion to that layer's resistance, the current through said relatively conductive layers causing a magnetic bias field which envelopes said magnetoresistive layers and the current through said magnetoresistive layers being divided into a number of paths at least equally the number of access means; and
monitoring means connected to the access means for measuring the currents through, and thus the resistance of, the layers of magnetoresistive material.

18. A transducer for indicating by its resistance the quantity of magnetic flux to which it is exposed, comprising:
a first odd-legged layer of material, having a first resistivity value and exhibiting a variable resistance in accordance with the magnetoresistive effect in an even number of discrete areas on said layers;
a second layer of material, generally shaped like the first layer, which is in direct electrical and magnetic contact with at least a portion of the first layer, has an electrical conductivity with respect to the first layer sufficient to provide magnetic bias to a significant portion of the first layer and which has a substantially constant resistance;
conductive means connected to said first and second layers for passing a current through each leg and area;
a source of electric current, connected to said conductive means, operable to supply a current to said conductors which current serves to provide aforesaid magnetic biasing field, and which passes through said discrete areas; and
measuring means connected to said conductive means for determining the resistance of the combined layers as a function of the current through the discrete areas.

19. A transducer for indicating by its resistance the quantity of magnetic flux to which it is exposed, comprising:
a number of first layers of material, each having a first resistivity value and exhibiting a variable resistance in accordance with the magnetoresistive effect in a plurality of discrete areas on said layers;
a number of second layers of material, each in direct electrical and magnetic contact with at least a portion of a first layer, having an electrical conductivity with respect to the first layers sufficient to provide magnetic bias to a significant portion of the first layers and having substantially constant resistance;
a source of electric current;
conductive means connected to said source and to said first and second layers for applying a current portion through each layer essentially inversely proportional to its resistance, the portion through the second layers serving to provide aforesaid magnetic biasing field, and the portion through said first layer being divided through said discrete areas; and
measuring means connected to said conductive means for determining the resistance of the combined layers as a function of the current through the discrete areas.

* * * * *